United States Patent [19]

Meguro et al.

[11] Patent Number: 5,016,610
[45] Date of Patent: May 21, 1991

[54] RADIANT TUBE TYPE HEATER

[75] Inventors: Kazunori Meguro; Toshiaki Itoh; Shigeru Abe, all of Oguni, Japan

[73] Assignee: Toshiba Ceramics Co., Ltd., Japan

[21] Appl. No.: 260,754

[22] Filed: Oct. 21, 1988

[51] Int. Cl.$^5$ ............................................. F23C 11/00
[52] U.S. Cl. .................................. 126/91 A; 264/65; 501/96
[58] Field of Search ............... 126/91 A; 501/96, 98, 501/92; 264/65

[56] References Cited
U.S. PATENT DOCUMENTS
4,502,983  3/1985  Omori et al. .
4,753,903  6/1988  Saito .................................. 501/88

FOREIGN PATENT DOCUMENTS
58-119020  8/1983  Japan .
61-291813  12/1986  Japan .

Primary Examiner—Larry Jones
Attorney, Agent, or Firm—Lorusso & Loud

[57] ABSTRACT

A radiant type heater for use in a heating furnace has inner and outer concentric tubes. The tubes have a structure in which silicon carbide particles are joined to each other by a sintering aid such as an aluminum compound sintering aid or a boron compound sintering aid.

13 Claims, 1 Drawing Sheet

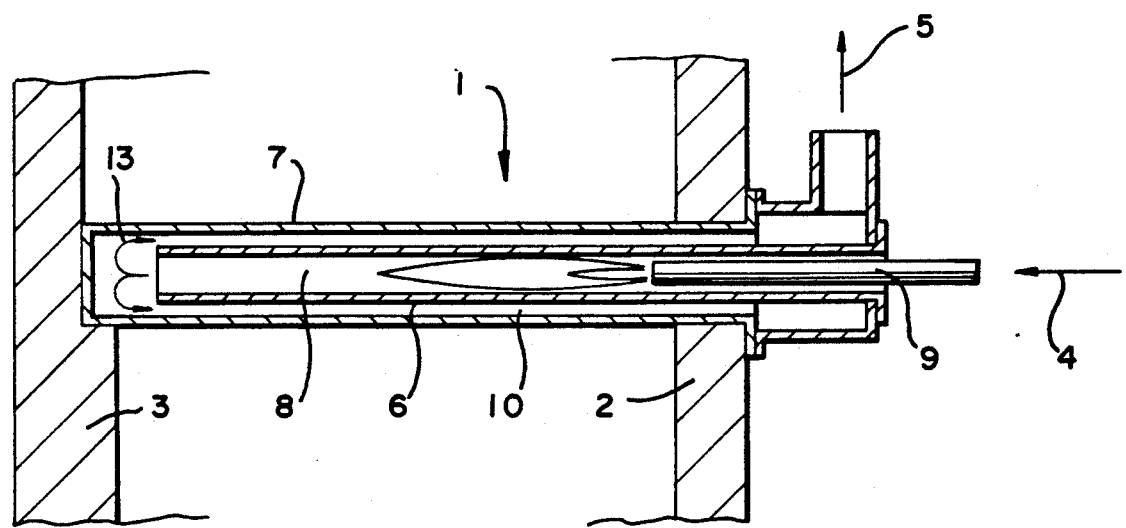

RADIANT TUBE TYPE HEATER

BACKGROUND OF THE INVENTION

This invention relates to a radiant tube type heater for use in a heating furnace such as a heat-treatment furnace for steels or a general purpose firing furnace.

In general, fuel oil, gas or electric heaters are used in order to directly heat a heat-treatment furnace. In such a direct-heating type furnace, it is difficult to control the furnace at a constant temperature.

To better maintain a constant temperature, a radiant tube type heater is often used in a heating furnace. One type of conventional radiant tube heater has only a single tube. Another conventional radiant tube heater has in combination concentric inner and outer tubes.

The conventional radiant heater tubes are normally made of a heat resistant steel or a silicon carbide refractory as disclosed in Japanese Utility Model Laid-Open No. 58-119020. One such heat resistant steel is mainly a Ni-Cr steel. Examples of silicon carbide refractories are $Si_3N_4$-bonded SiC or clay-bonded SiC.

If the conventional radiant tube type heaters are used in an environment subject to a sudden change in temperature, problems due to thermal shock arise. Futher, in the case of heat resistant steels, the heater tube is subject to severe oxidation and scaling to the extent that it easily deforms. Thus, its life time is nomally only 3 to 6 months. In case of $Si_3N_4$ or clay-bonded SiC, the radiant tube is easily oxidized to form a $SiO_2$ phase or glass phase which is very susceptible to creep and cracking whereby its life time is normally only 6 to 12 months.

SUMMARY OF THE INVENTION

The object of this invention is to provide a radiant tube heater having a prolonged useful service life.

This invention is directed to radiant heater tubes both in the form of a single tube and in the form of a combination of concentric inner and outer tubes. The single tube or at least one of the inner and outer tubes has a high density, fine-grained structure in which silicon carbide particles are joined to each other by an aluminum (Al) or boron (B) compound sintering aid. In other words, the aluminum or boron compound serves as a binder for the silicon carbide particles. Preferably, 85-97 wt. % of silicon carbide is combined with 3-15 wt. % of a sintering aid.

The tubular product of the present invention contains silicon carbide and a Al compound or B compound sintering aid sintered together in a very dense, fine-grained structure lacking a glass or $SiO_2$ phase. Therefore, creeping and cracking can be avoided.

In addition, if the silicon carbide and the Al or B sintering aid are pressureless-sintered, then the grain structure is fine and the finished tube has a high termal conductivity of 40-70 W/m°K so that when used in an industrial furnace it is easy to maintain the furnace at a constant and uniform temperature. The available heat is in the range of 60-70% so that the heat efficiency is remarkable. The silicon carbide product itself is highly resistant to oxidation and has a density approximating (near) the theoretical density of SiC.

We have found that hot pressing sintering methods are unsuitable for forming a radiant heater tube from such materials.

Incidentally, a conventional radiant type heater tube made of recrystallized SiC is easily oxidized and broken.

A conventional radiant tube type heater made of $Si_3N_4$ bonded SiC has a thermal conductivity of merely 15-20 W/m°K.

BRIEF DESCRIPTION OF THE DRAWING

The sole drawing FIGURE is a cross-sectional view of a concentric tube burner in accordance with one embodiment of the present invention.

DESCRIPTION OF THE PREFERRED EMBODIMENTS

A preferred embodiment of this invention is shown in the drawing figure as a concentric tube burner element, spanning walls 2 and 3 of a metallurgical furnace. An inner tube 6 is arranged inside an outer tube 7 in a conventional manner as disclosed in Japanese Utility Model Laid-Open No. 58-119020. In operation a fluid fuel enters at 4 and burns as it exits the burner nozzle 9. The hot, gaseous products of combustion pass through the center 8 of inner tube 6, reverse at 13, flow through the annular space 10 and exit at 5.

The inner tube 6 may be provided with a number of small holes to facilitate heat transfer from the inner tube 6 to the outer tube 7.

In order to provide a dense, fine-grained product, the grain size of the SiC and that of the sintering aid are preferrably both less than 1 micron.

In the preferred embodiments of this invention, a radiant heater tube(s) is made of a ceramic material consisting essentially of 85-97 wt. % silicon carbide and 3-15 wt. % of a B or Al compound sintering aid. The product is very fine-grained and dense and has a prolonged service life.

EXAMPLE 1

96 wt. % SiC powder, 1 wt. % $B_4C$ as a sintering aid and 6 wt. % phenol resin (actual carbon content of 50 wt. %) as a binder were blended and mixed by a wet method. After the mixture was dried, it was formed into pellets and then shaped by a cold isostatic pressing method using a rubber press so as to produce an inner radiant tube. This shaped tube was sintered at 2,280° C. in an inert gas (argon) atmosphere to produce a sintered tube. This procedure would be characterized as "pressureless" sintering.

The sintered tube had a BST (cold bending strength) of 4,060 Kg/cm$^2$ and an open porosity of 0.1%.

The radiant tube produced was placed into actual service in a heating furnace. The tube served satisfactorily for 875 days. After 875 days, a central portion of the tube cracked.

The above demonstrates that the service life of a tube according to this invention is remarkably prolonged as compared to a conventional Ni-Cr heat resistant steel tube or a recrystallized SiC tube of large porosity.

EXAMPLE 2

In order to obtain a pressureless-sintered SiC, as a sintering aid, a combination of AlN and $Al_2O_3$ were used as disclosed in Japanese Patent Laid-Open No. 61-291813. An outer radiant tube and an inner radiant tube made of such a self-sintered SiC in combination were produced in substantially the same manner as described above in Example 1 and placed into service in a heating furnace. Not until after 605 days of service did the outer tube crack.

As a result of our analysis, we discovered that such cracking of the outer radiant tube depends on its hot bending strength.

In order to improve the hot bending strength, we experimented with reduction of the amount of the sintering aid added. With the amount of sintering aid in the range of 3–15 wt. %, some advantageous effects could be obtained. Particularly in case of about 5 wt. %, the best results could be obtained. For example, when the inner and outer tubes with the about 5 wt. % of sintering aid were used in the heating furnace, even after 890 days, the tubes were not cracked or broken and only creeped by 1.5 mm or so.

EXAMPLE 3

Further, SiC, $B_4C$ and carbon black were used so as to produce an outer radiant tube and an inner radiant tube in substantially the same manner as described in Example 1. When the inner and outer tubes were used in the furnace, even after 1,016 days, no cracking or creeping was found.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A radiant heater for use in a metallurgical heating furnace, comprising an outer tube fixed to the heating furnace and an inner tube concentric with the outer tube defining an annular space therebetween, at least one of said inner and outer tubes having a grain structure in which silicon carbide particles are joined together by a sintering aid in pressureless sintering, said grain structure consisting essentially of silicon carbide, carbon and 3–15 wt % of a sintering aid, the sintering aid being selected from the group consisting of aluminum compounds and boron compounds.

2. The radiant heater of claim 1 wherein said silicon carbide and said sintering aid are particles of submicron size sintered together into said structure, said structure lacking a glass phase.

3. The radiant heater of claim 1, wherein the inner tube has many small through-holes for facilitating transfer of heat produced in the inner tube to the outer tube.

4. The radiant heater of claim 1 wherein said silicon carbide and said sintering aid are particles of submicron size sintered together into said structure, said structure lacking a glass phase.

5. The radiant heater of claim 1, wherein at least one of the inner and outer tubes has a thermal conductivity of 40–70 W/m°K.

6. The radiant heater of claim 1 wherein said sintering aid is 4–15 wt % of said structure.

7. The radiant heater of claim 1 wherein said sintering aid is about 5 wt % of said structure.

8. A radiant heater for use in a metallurgical heating furnace, comprising a tube fixed to the heating furnace and having a grain structure in which silicon carbide particles are joined together with a sintering aid by pressureless sintering, said grain structure consisting essentially of silicon carbide, carbon and 3–15 wt % of a sintering aid, the sintering aid being selected from the group consisting of aluminum compounds and boron compounds.

9. The radiant heater of claim 8, wherein the tube has a thermal conductivity of 40–70 W/m°K.

10. The radiant heater of claim 8 wherein said sintering aid is 4–15 wt % of said structure.

11. The radiant heater of claim 8 wherein said sintering aid is about 5 wt % of said structure.

12. A method of heating molten metal in a metallurgical furnace comprising immersing at least one radiant heater element in said molten metal, said radiant heater element comprising at least one tube having a grain structure in which silicon carbide particles are joined together by a sintering aid in pressureless sintering, said grain structure consisting essentially of silicon carbide, carbon and 3–15 wt % of a sintering aid, the sintering aid being selected from the group consisting of aluminum compounds and boron compounds.

13. The method of claim 12 wherein said molten metal is aluminum or lead.

* * * * *

UNITED STATES PATENT AND TRADEMARK OFFICE
CERTIFICATE OF CORRECTION

PATENT NO. : 5,016,610
DATED : May 21, 1991
INVENTOR(S) : MEGURO et al

It is certified that error appears in the above-identified patent and that said Letters Patent is hereby corrected as shown below:

Column 1, line 56, "termal" should read --thermal--.

Column 4, line 6, (first line of claim 4), "1" should read --8--.

Signed and Sealed this

Ninth Day of February, 1993

Attest:

STEPHEN G. KUNIN

*Attesting Officer*      *Acting Commissioner of Patents and Trademarks*